United States Patent
Lu

(10) Patent No.: US 12,373,134 B2
(45) Date of Patent: Jul. 29, 2025

(54) MEMORY DEVICE FRAGMENTATION ANALYSIS BASED ON LOGICAL-TO-PHYSICAL TABLES

(71) Applicant: Yangtze Memory Technologies Co., Ltd., Hubei (CN)

(72) Inventor: Zhenran Lu, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/496,816

(22) Filed: Oct. 27, 2023

(65) Prior Publication Data

US 2025/0103243 A1    Mar. 27, 2025

Related U.S. Application Data

(63) Continuation of application No. PCT/CN2023/120240, filed on Sep. 21, 2023.

(51) Int. Cl.
   *G06F 3/06* (2006.01)
(52) U.S. Cl.
   CPC .......... *G06F 3/0658* (2013.01); *G06F 3/0607* (2013.01); *G06F 3/0679* (2013.01)
(58) Field of Classification Search
   CPC .............................................. G06F 12/02–063
   See application file for complete search history.

(56) References Cited

U.S. PATENT DOCUMENTS

| | | | | |
|---|---|---|---|---|
| 10,140,067 | B1 * | 11/2018 | Horn | G06F 3/0659 |
| 2007/0226265 | A1 * | 9/2007 | Nichols | G06F 3/0671 |
| 2007/0226445 | A1 * | 9/2007 | Nichols | G06F 16/9017 |
| | | | | 711/170 |
| 2015/0220268 | A1 | 8/2015 | Duzly et al. | |
| 2015/0220552 | A1 * | 8/2015 | Duzly | G06F 16/00 |
| | | | | 707/693 |
| 2019/0294555 | A1 * | 9/2019 | Aiba | G06F 3/0659 |
| 2023/0195353 | A1 | 6/2023 | Zilberstein et al. | |
| 2023/0236966 | A1 | 7/2023 | Yarimi et al. | |
| 2024/0201850 | A1 * | 6/2024 | Gohain | G06F 3/0643 |

FOREIGN PATENT DOCUMENTS

WO    WO2018032743    *    2/2017    ............. G06F 17/30

OTHER PUBLICATIONS

International Search Report in International Appln. No. PCT/CN2023/120240, mailed on Feb. 23, 2024, 4 pages.
JEDEC Solid State Technology Association, "JEDEC Updates Universal Flash Storage and Supporting Memory Interface Standard," Aug. 23, 2022, retrieved on Mar. 18, 2024, retrieved from URL <https://www.eetasia.com/jedec-updates-universal-flash-storage-and-supporting-memory-interface-standard/>, 4 pages.

* cited by examiner

*Primary Examiner* — Khoa D Doan
(74) *Attorney, Agent, or Firm* — Fish & Richardson P.C.

(57) ABSTRACT

The present disclosure relates to fragmentation evaluation in a memory system. In one example, a method for operating a memory controller includes receiving, from a host, a request for a fragmentation level of a file stored in a memory device. The method further includes determining a read performance level of the file based on a logical-to-physical (L2P) address mapping table corresponding to the file without reading the file from the memory device. The method further includes determining the fragmentation level based on the read performance level.

20 Claims, 9 Drawing Sheets

MEMORY DEVICE FRAGMENTATION ANALYSIS BASED ON LOGICAL-TO-PHYSICAL TABLES

CROSS-REFERENCE TO RELATED APPLICATIONS

This application is a continuation of International Application No. PCT/CN2023/120240, filed on Sep. 21, 2023, the disclosure of which is hereby incorporated by reference in its entirety.

TECHNICAL FIELD

The present disclosure generally relates to memory devices and memory systems, and in particular, to systems and methods for defragmentation of a memory device.

BACKGROUND

Data stored in a memory device may become fragmented over time. Fragmentation can slow down the performance of the memory device by reducing the access and processing speed of the memory device. In some implementations, fragmentation further causes undesirable corruption and data loss in the memory device. Defragmentation is a process that reduces the degree of fragmentation by reorganizing the memory device's data for faster access and better system performance.

SUMMARY

The present disclosure relates to fragmentation evaluation in a memory system. In one example, a method for operating a memory controller includes receiving, from a host, a request for a fragmentation level of a file stored in a memory device. The method further includes determining a read performance level of the file based on a logical-to-physical (L2P) address mapping table corresponding to the file without reading the file from the memory device. The method further includes determining the fragmentation level based on the read performance level.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
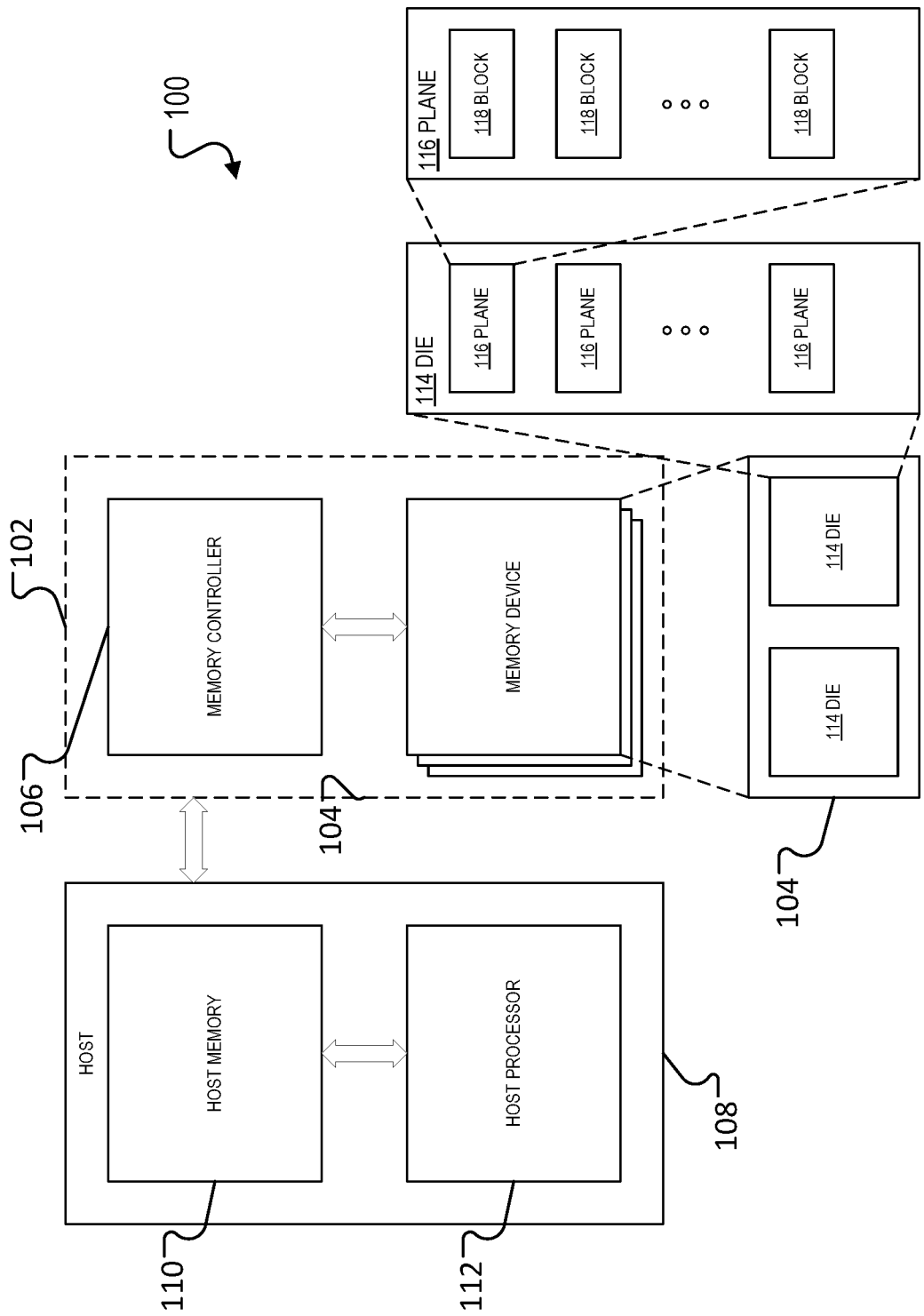
FIG. 1 illustrates a block diagram of an example system having a memory device, according to some aspects of the present disclosure.

A defragmentation process may rearrange a fragmented file to store pieces of file data in close or even consecutive physical locations in a memory device. For example, Universal Flash Storage (UFS) protocols provide a file based optimization (FBO) function. The FBO function allows a host and a flash memory device (e.g., a NAND device) to cooperate during the defragmentation process. The host may first evaluate how fragmented files in the flash memory device are by querying fragmentation levels (also referred to as degrees of fragmentation) of the files from the flash memory device. After the host is aware of a fragmentation level of a file, the host may determine whether or not to perform fragmentation of the file based on the fragmentation level. If so, the host may instruct the flash memory device to defragment the file to improve the file access performance.

The fragmentation level of the file may be measured or evaluated in different ways. For example, a controller may read the file from the flash memory device to determine how the file is scattered in different locations of the flash memory device. This may not be an efficient way because it occupies resources and processing power of the flash memory device and even the host. In addition, frequent memory read operations may reduce the reliability of the flash memory device due to the read disturb phenomenon. Another fragmentation evaluation method involves estimating the performance of the flash memory device based on the data's real-time distribution among physical addresses of the flash memory device. This method may use sophisticated algorithms and thus is difficult to implement when the rea-time distribution of the data is complicated. Therefore, efficient and practical fragmentation evaluation techniques are desired.

The present disclosure provides fragmentation evaluation techniques based on logic-to-physical (L2P) address mapping tables (also referred to as L2P tables or L2P mapping tables). In some implementations, a controller may receive from a host a request for a fragmentation level of a file stored in a memory device. The controller may determine a read performance level of the file based on a L2P address mapping table corresponding to file without reading the file from the memory device. The controller may determine the fragmentation level based on the read performance level and return the fragmentation level to the host.

The techniques described in the present disclosure can be implemented to realize one or more of the following advantages. First, compared with some existing methods, the proposed fragmentation evaluation techniques avoid reading actual file data from physical addresses and thus are more efficient and consume fewer resources. Second, the proposed fragmentation evaluation techniques may not reduce the reliability of a memory device. Third, the proposed fragmentation evaluation techniques may provide more accurate results because a distribution of the file among different planes of the memory device is considered.

The above aspects and some other aspects of the present disclosure are discussed in greater detail below.

FIG. 1 illustrates a block diagram of an example system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 having a host memory 110 and a host processor 112, and a memory system 102 having one or more memory devices 104 and a memory controller 106.

Host 108 can be a processor of an electronic device, such as a central processing unit (CPU), or a system-on-chip (SoC), such as an application processor (AP). Host 108 can be coupled to memory controller 106 and configured to send or receive data to or from memory devices 104 through memory controller 106. For example, host 108 may send the program data in a program operation or receive the read data in a read operation. Host processor 112 can be a control unit (CU), or an arithmetic & logic unit (ALU). Host memory 110 can be memory units including register or cache memory. Host 108 is configured to receive and transmit instructions and commands to and from memory controller 106 of memory system 102, and execute or perform multiple functions and operations provided in the present disclosure, which will be described later.

Memory device 104 can be any memory device disclosed in the present disclosure, such as a NAND Flash memory device. It is noted that the NAND Flash is only one example of the memory device for illustrative purposes. It can include any suitable solid-state, non-volatile memory, e.g., NOR Flash, Ferroelectric RAM (FeRAM), Phase-change memory (PCM), Magnetoresistive random-access memory (MRAM), Spin-transfer torque magnetic random-access memory (STT-RAM), or Resistive random-access memory (RRAM), etc. In some implementations, memory device 104 includes a three-dimensional (3D) NAND Flash memory device.

As shown in FIG. 1, memory device 104 may include one or more dies 114. A die 114 may also be referred to as a memory cell array and include multiple planes 116. Each plane 116 may include multiple physical blocks 118.

Memory controller 106 can be implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described below in detail.

Memory controller 106 is coupled to memory device 104 and host 108 and is configured to control memory device 104, according to some implementations. Memory controller 106 can manage the data stored in memory device 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid state drives (SSDs) or embedded multi-media-cards (eMMCs) used as data storage for mobile devices, such as smartphones, tablets, laptop computers, etc., and enterprise storage arrays. Memory controller 106 can be configured to control operations of memory device 104, such as read, erase, and program operations, by providing instructions, such as read instructions, to memory device 104. For example, memory controller 106 may be configured to provide a read instruction to a peripheral circuit of memory device 104 to control the read operation. Memory controller 106 can also be configured to manage various functions with respect to the data stored or to be stored in memory device 104 including, but not limited to bad-block management, garbage collection, logical-to-physical address conversion, wear leveling, etc. In some implementations, memory controller 106 is further configured to process error correction codes (ECCs) with respect to the data read from or written to memory device 104. Any other suitable functions may be performed by memory controller 106 as well, for example, formatting memory device 104.

Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc. Memory controller 106 is configured to receive and transmit a command to and from host 108, and execute or perform multiple functions and operations provided in the present disclosure, which will be described later.

Figure 2A:
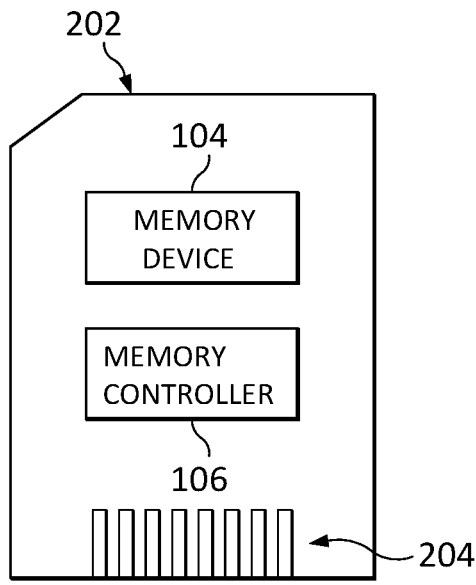
FIGS. 2A-2B illustrate example storage products, according to some aspects of the present disclosure.
Figure 2B:
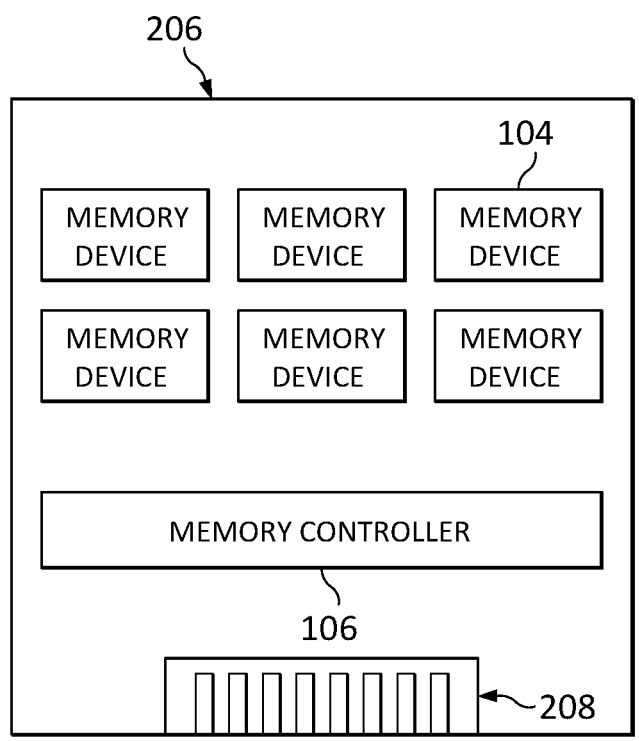

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202.

Figure 3:
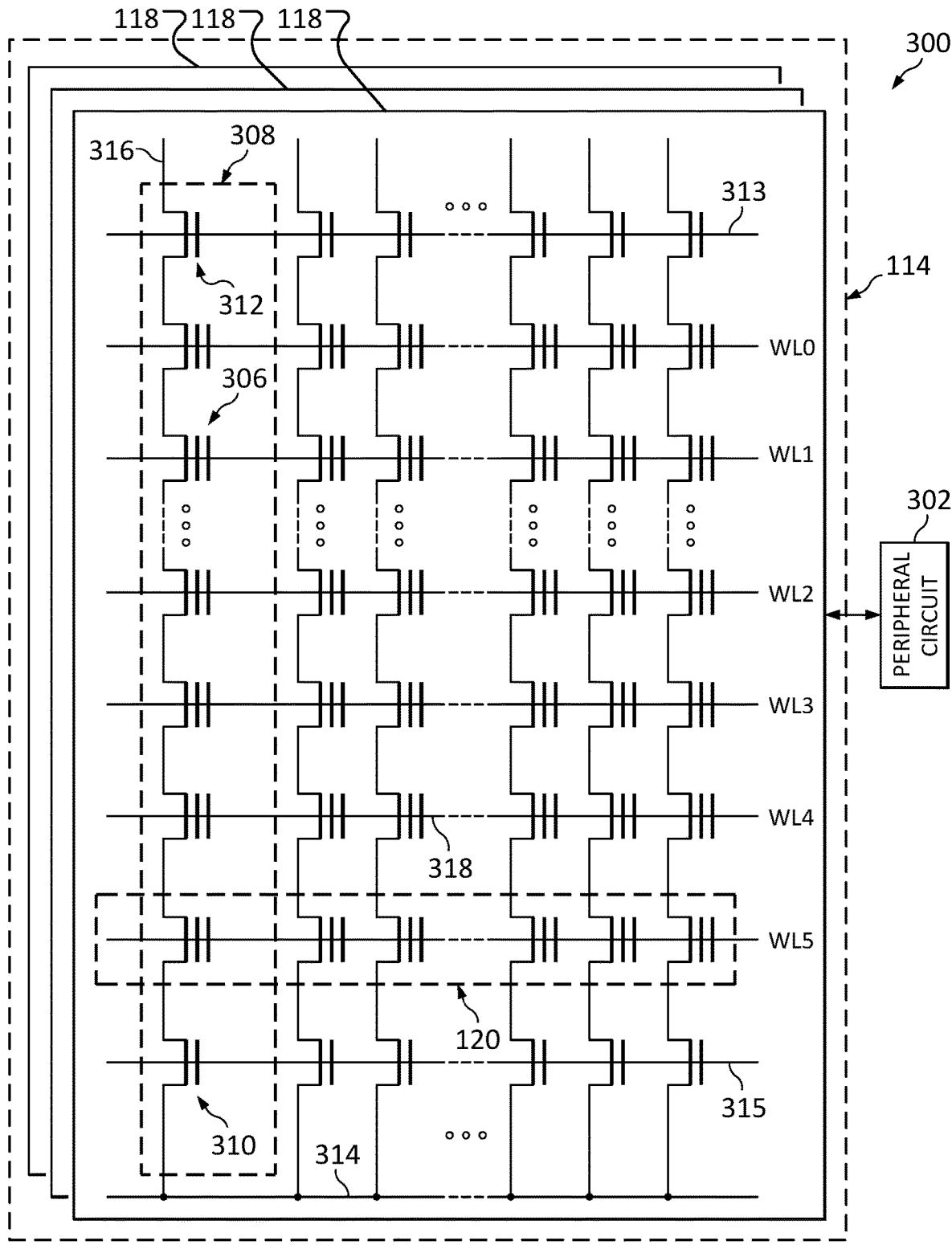
FIG. 3 illustrates a schematic circuit diagram of an example memory device including peripheral circuits, according to some aspects of the present disclosure.

FIG. 3 illustrates a schematic circuit diagram of an example memory device 300 including peripheral circuits, according to some aspects of the present disclosure. Memory device 300 can be an example of memory device 104 in FIG. 1. It is noted that the NAND Flash disclosed herein is only one example of the memory device for illustrative purposes. It can include any suitable solid-state, non-volatile memory, e.g., NOR Flash, FeRAM, PCM, MRAM, STT-RAM, or RRAM, etc. Memory device 300 can include a die or a memory cell array 114 and peripheral circuits 302 coupled to memory cell array 114. Memory cell array 114 can be a NAND Flash memory cell array in which memory cells 306 are provided in the form of an array of NAND memory strings 308 each extending vertically above a substrate (not shown). In some implementations, each NAND memory string 308 includes a plurality of memory cells 306 coupled in series and stacked vertically. Each memory cell 306 can hold a continuous, analog value, such as an electrical voltage or charge, which depends on the number of electrons trapped within a region of memory cell 306. Each memory cell 306 can be either a floating gate type of memory cell including a floating-gate transistor or a charge trap type of memory cell including a charge-trap transistor.

In some implementations, each memory cell 306 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 306 is a multi-level cell (MLC) that is capable of storing more than a single bit of data in more than four memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 3, each NAND memory string 308 can include a source select gate (SSG) transistor 310 at its source end and a drain select gate (DSG) transistor 312 at its drain end. SSG transistor 310 and DSG transistor 312 can be configured to activate selected NAND memory strings 308 (columns of the array) during read and program operations. In some implementations, the sources of NAND memory strings 308 in the same physical block 118 are coupled through a same source line (SL) 314, e.g., a common SL. In other words, NAND memory strings 308 in the same physical block 118 have an array common source (ACS), according to some implementations. The drain of DSG transistor 312 of each NAND memory string 308 is coupled to a respective bit line 316 from which data can be read or written via an output bus (not shown), according to some implementations. In some implementations, each NAND memory string 308 is configured to be selected or deselected by applying a select voltage (e.g., above the threshold voltage of DSG transistor 312) or a deselect voltage (e.g., 0 V) to the gate of respective DSG transistor 312 through one or more DSG lines 313 and/or by applying a select voltage (e.g., above the threshold voltage of SSG transistor 310) or a deselect voltage (e.g., 0 V) to the gate of respective SSG transistor 310 through one or more SSG lines 315.

As shown in FIG. 3, NAND memory strings 308 can be organized into multiple physical blocks 118, each of which can have a common source line 314, e.g., coupled to the ACS. In some implementations, each physical block 118 is the basic data unit for erase operations, i.e., memory cells 306 on the same physical block 118 are erased at the same time. To erase memory cells 306 in a selected physical block 118, source lines 314 coupled to selected physical block 118 as well as unselected physical blocks 118 in the same plane as selected physical block 118 can be biased with an erase voltage (Vers), such as a high positive voltage (e.g., 20 V or more). Memory cells 306 of adjacent NAND memory strings 308 can be coupled through word lines 318 that select which row of memory cells 306 is affected by the read and program operations. Peripheral circuits 302 can be coupled to memory cell array 114 through bit lines 316, word lines 318, source lines 314, SSG lines 315, and DSG lines 313. Peripheral circuits 302 can include any suitable analog, digital, and mixed-signal circuits for facilitating the operations of memory cell array 114 by applying and sensing voltage signals and/or current signals to and from each target memory cell 306 through bit lines 316, word lines 318, source lines 314, SSG lines 315, and DSG lines 313. Peripheral circuits 302 can include various types of peripheral circuits formed using metal-oxide-semiconductor (MOS) technologies.

Figure 4:
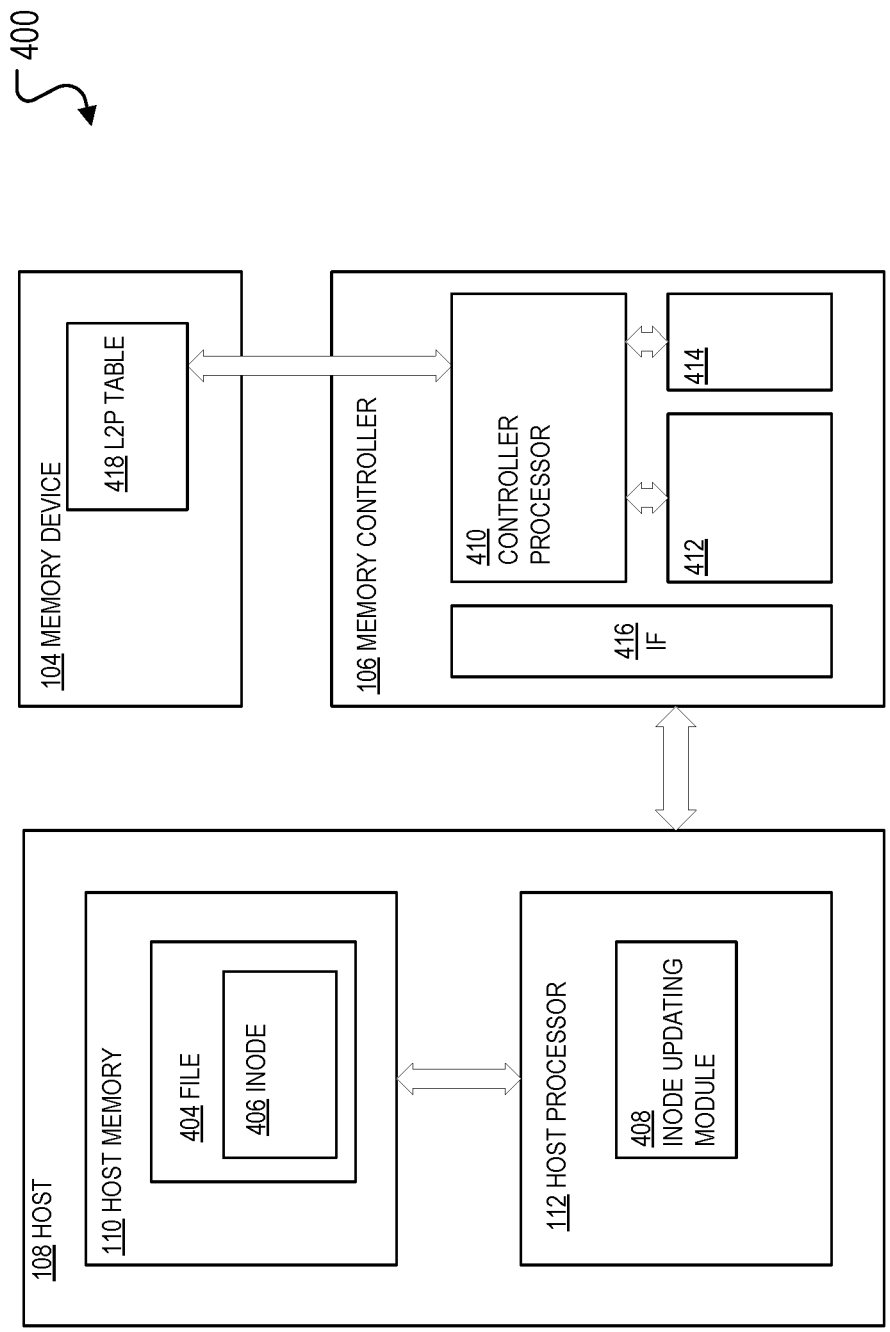
FIG. 4 illustrates a block diagram of an example system including a memory device, a memory controller, and a host, according to some aspects of the present disclosure.

FIG. 4 illustrates a block diagram of an example system 400 including a memory device 104, a memory controller 106, and a host 108, according to some aspects of the present disclosure. In some implementations, memory device 104 is a NAND device. As shown in FIG. 4, host 108 may include a host memory 110 and a host processor 112. Host memory 110 may store logical addresses, e.g., a logical block address (LBA) of files (e.g., file 404), and an index node 406 (e.g., inode) of the files. Host processor 112 may include or be coupled to an index node updating module 408 (e.g., inode updating module). Index node updating module 408 is configured to update index node 406 of the files. It is noted that the index node (e.g., inode) may be a data structure in a Unix-style file system that describes a file-system object such as a file or a directory. It can be a file data structure that stores information about any Linux file except its name and data. It stores metadata of the file including the file size, the device on which the file is stored, user and group IDs associated with the file, or permissions needed to access the file.

As shown in FIG. 4, memory controller 106 can include a controller processor 410, such as a memory chip controller (MCC) or a memory controller unit (MCU). Controller processor 410 is configured to control modules to execute commands or instructions to perform functions disclosed in the present disclosure. Controller processor 410 can also be configured to control the operations of each peripheral circuit by generating and sending various control signals, such as read commands for read operations. Controller processor 410 can also send clock signals at desired frequencies, periods, and duty cycles to other peripheral circuits 302 to orchestrate the operations of each peripheral circuit 302, for example, for synchronization.

Memory controller 106 can further include at least one of a volatile controller memory 412 and a non-volatile controller memory 414. In some implementations, memory controller 105 may include both volatile controller memory 412 and non-volatile controller memory 414. In some implementations, memory controller 105 may include either volatile controller memory 412 or non-volatile controller memory 414. Volatile controller memory 412 can include a register or cache memory such that it allows a faster access and process speed to read, write, or erase the data stored therein, while it may not retain stored information after power is removed. In some implementations, volatile controller memory 412 includes either dynamic random-access memory (DRAM) or static random-access memory (SRAM). Non-volatile controller memory 414 can retain the stored information even after power is removed. In some implementations, non-volatile controller memory 414 includes NAND, NOR, FeRAM, PCM, MRAM, STT-RAM, or RRAM. In some implementations, non-volatile controller memory 414 may not be provided in the memory controller 106. For example, non-volatile controller memory 414 is deposed outside of the memory controller 106 but is coupled to the memory controller 106.

As shown in FIG. 4, memory controller 106 can include a memory controller interface 416 configured to receive and transmit commands or instructions to and from host 108. In some implementations, memory controller interface 416 is coupled to the controller processor 410 and is configured to receive and transmit commands or instructions that cause controller processor 410 to perform functions disclosed in the present disclosure.

L2P address mapping tables may be stored in various locations of the system 400. A L2P address mapping table 418 may be stored in a non-volatile memory such as memory device 104 (e.g., a NAND device) and non-volatile controller memory 414. This way, address mapping data in the L2P address mapping table 418 will not be erased after power off. In some implementations, a L2P address mapping table is stored and processed in a volatile memory such as volatile controller memory 412. In some implementations, after the system boots up or restarts, a L2P address mapping table can be loaded from memory device 104 or non-volatile controller memory 414 and stored in volatile controller memory 412 for faster access and processing speed on a regular basis. In some implementations, L2P address mapping table 418 may include address mapping data corresponding to file 404 in host memory 110.

Memory controller 106 may include an address mapping table updating module (not shown in FIG. 4) configured to generate and update L2P address mapping table 418. The address mapping table updating module may be implemented through a firmware program in the firmware of controller processor 410. In some implementations, the address mapping table updating module is in controller processor 410 or coupled to controller processor 410, and may be controlled by controller processor 410 to execute commands and instructions from host 108. For instance, the address mapping table updating module is configured to execute a mapping update command received from host 108 and update L2P address mapping table 418 accordingly.

Figure 5A:
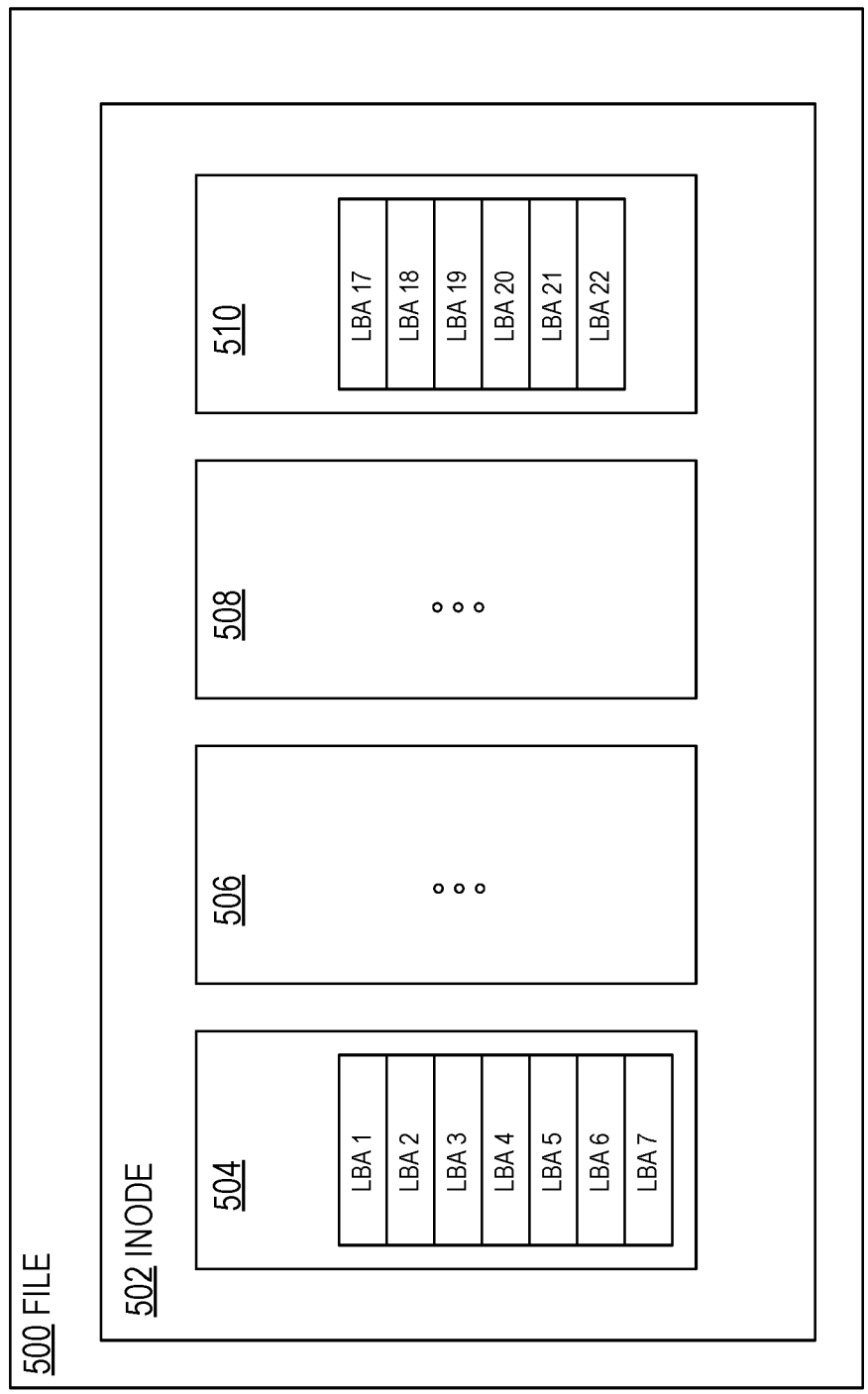
FIGS. 5A-5C illustrate example logical addresses and physical addresses of a file, according to some aspects of the present disclosure.
Figure 5B:
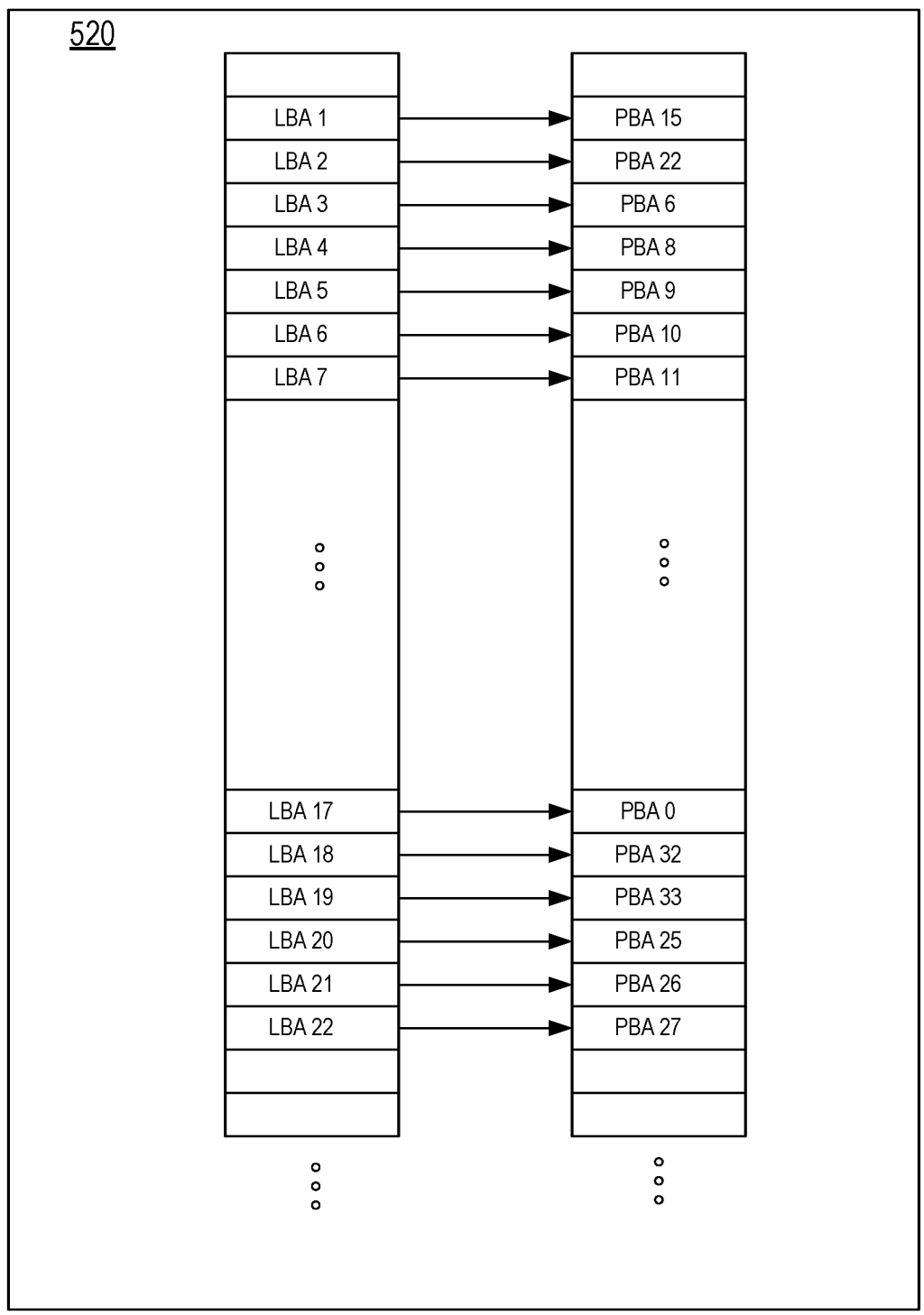
Figure 5C:
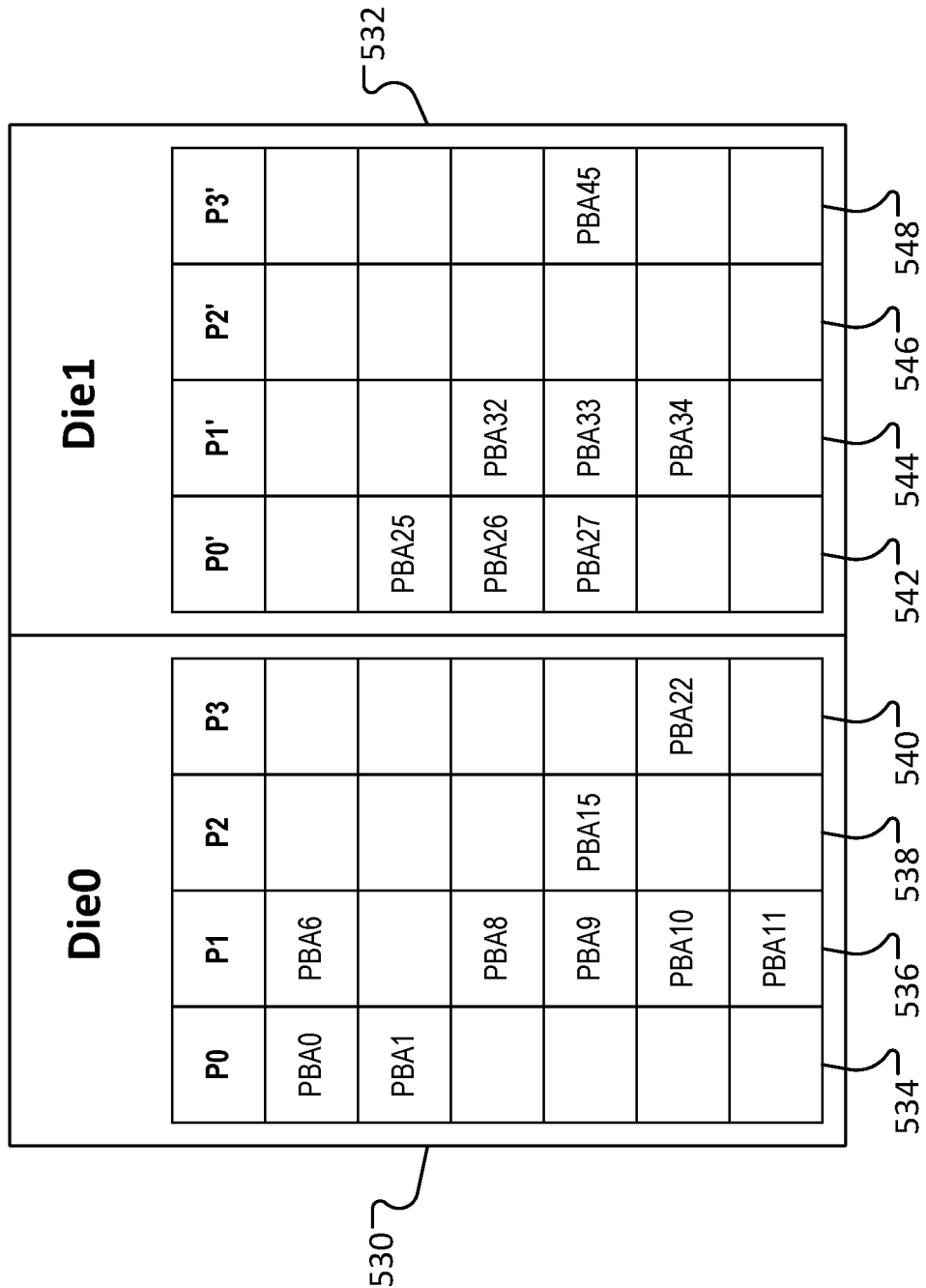

FIGS. 5A-5C illustrate example logical addresses and physical addresses of a file 500, according to some aspects of the present disclosure. File 500 is an example of file 404 of FIG. 4. As shown in FIG. 5A, an inode 502 of file 500 may include a list of LBA segments 504, 506, 508, and 510. Each of LBA segments 504, 506, 508, and 510 includes one or more consecutive LBAs. It should be appreciated that the LBA segments 504, 506, 508, and 510 in FIG. 5A are for illustration purposes, and a LBA segment in practical implementation may include more LBAs than the LBA segments in FIG. 5A. Data of file 500 is stored in physical addresses of a memory device. FIG. 5B illustrates an example L2P address mapping table 520, in which logical addresses of file 500 are mapped to physical addresses of file 500 in the memory device. L2P address mapping table 520 may be an example of L2P address mapping table 418 of FIG. 4. When a controller reads file 500, the controller first determines the physical addresses based on the L2P address mapping table 520, and then reads data from the physical addresses. As shown in FIG. 5B, each LBA of file 500 is mapped to a physical block address (PBA). It should be appreciated that even though L2P address mapping table 520 indicates that file 500 is stored in the PBAs illustrated by the L2P address mapping table 520, the index numbers of the PBAs of file 500 are for illustrative purposes and may be different from the PBAs in a memory device in real implementations. FIG. 5C illustrates an example where the physical addresses of file 500 are scattered among various planes in two dies 530 and 532 of the memory device. In this example, each of the two dies has four planes. Die 530 includes planes 534, 536, 538, and 540, and die 532 includes planes 542, 544, 546, and 548. The PBAs of file 500 are located among the eight planes of the memory device.

Figure 6:
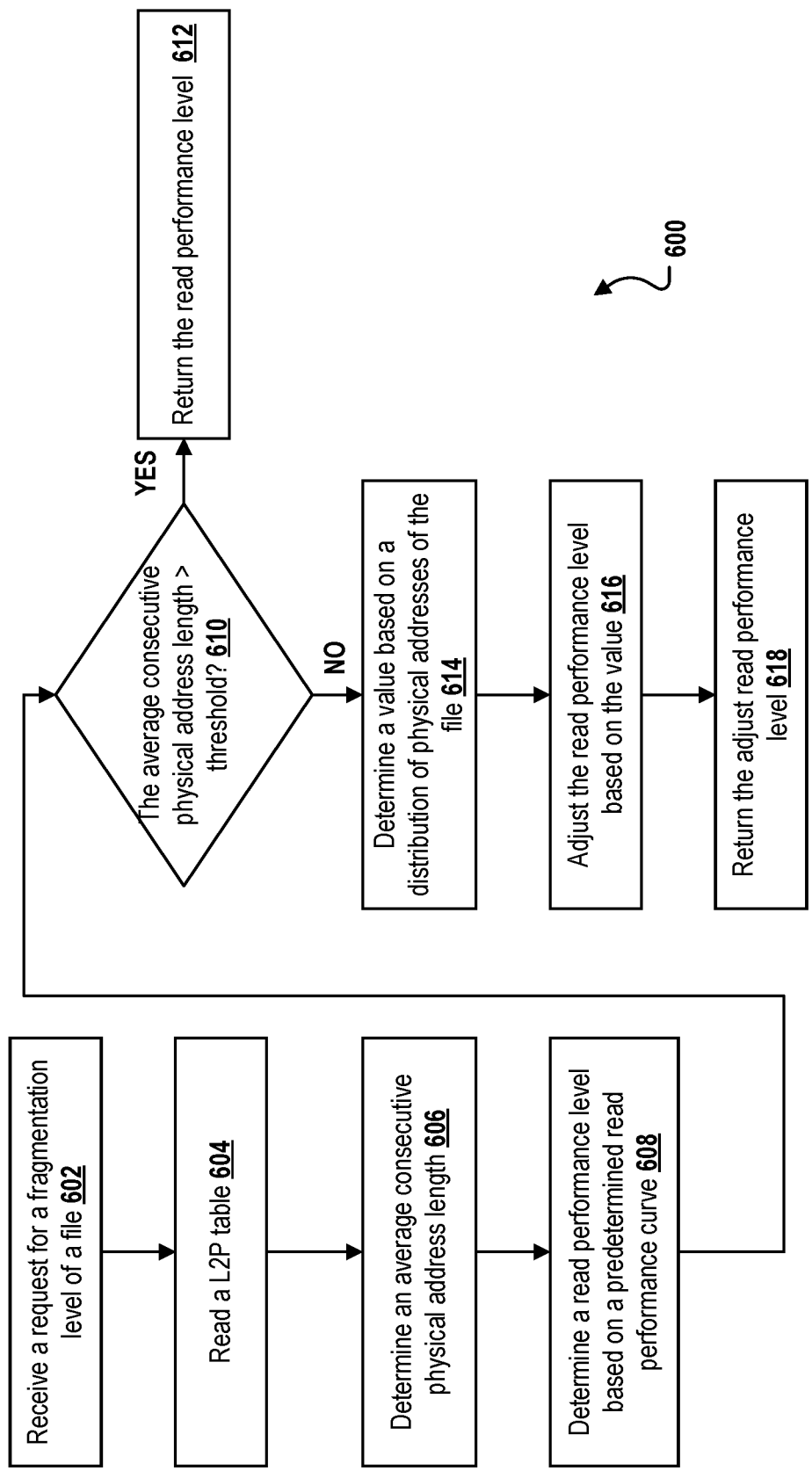
FIG. 6 illustrates a flowchart of an example method for fragmentation evaluation, in accordance with some aspects of the present disclosure.

FIG. 6 is a flowchart of an example method 600 for fragmentation evaluation, in accordance with some aspects of the present disclosure. The method 600 may be performed by a memory controller (e.g., memory controller 106 in FIG. 1). The operations shown in method 600 may not be exhaustive and that other operations can be performed as well before, after, or between any of the illustrated operations. Further, some of the operations may be performed simultaneously, or in a different order than shown in FIG. 6. In some implementations, the method 600 may be performed by a firmware program of a controller processor (e.g., controller process 410 in FIG. 4) in the memory controller. Programming instructions may be stored in a computer storage medium and may be executed by the controller processor to perform the operations shown in method 600. In some implementations, the programming instructions may be stored in a volatile memory (such as an SRAM). In some implementations, the programming instructions may be stored in a non-volatile memory (such as the memory device 104 or the non-volatile controller memory 414) so that they will not be erased after the memory controller powers off. The programming instructions may be loaded into a fast speed memory such as a tightly coupled memory (TCM) or a volatile memory (e.g., the volatile controller memory 412 in FIG. 4) and executed by the controller processor when the memory controller boots up.

At 602, the memory controller receives a request from a host. The request may query a fragmentation level of a file stored in the memory device. The request may include logical addresses of the file. For example, the request may indicate an inode, which includes one or more LBAs (e.g., LBAs 1-7, 10, 12-13, and 17-22 of FIG. 5B) of the file. In some implementations, the request is a FBO request under a UFS 4.0 technical standard.

At 604, the memory controller reads a L2P address mapping table associated with the file. In some implementations, the memory controller may load the L2P address mapping table from a volatile controller memory (e.g., volatile controller memory 412 in FIG. 4) or a non-volatile controller memory (e.g., non-volatile controller memory 414 in FIG. 4). The L2P address mapping table in the volatile controller memory or the non-volatile controller memory may be loaded from a memory device (e.g., memory device 104 in FIG. 1).

At 606, the memory controller determines an average consecutive physical address length of the file. The memory controller may first determine physical addresses of the file based on the logical addresses of the file and the L2P address mapping table. The physical addresses of the file can be split into one or more physical address segment, and each physical address segment includes one or more consecutive physical addresses. In some implementations, each physical address is a PBA of a predetermined size (e.g., 4K bytes). In some implementations, the average consecutive physical address length may be determined based on a quantity of the one or more physical address segment and how many consecutive physical addresses each physical address segment includes.

For instance, the file includes 4 physical address segments. The first physical address segment has 2 consecutive PBAs. The second physical address segment has 4 consecutive PBAs. The third physical address segment has 6 consecutive PBAs. The fourth physical address segment has 8 consecutive PBAs. Thus, this file has 5 consecutive PBAs on average (i.e., the sum of 2, 4, 6, and 8 divided by 4 is 5). In this example, the size of a PBA is 4K bytes (KB). Therefore, the memory controller can determine that the average consecutive physical address length of the file is 20 KB.

In some implementations, the average consecutive physical address length of the file can be determined using the following algorithm performed by a memory controller.

Step 1: Set an initial value of a PBA consecutive segment counter as 1. Determine the first LBA of the file based on an index node of the file. Determine a PBA mapped to the first LBA based on an L2P address mapping table of the file. Set the PBA mapped to the first LBA as a current PBA.

Step 2: Determine a next LBA of the file and a next PBA mapped to the next LBA. Check whether the next PBA is a subsequent physical address of the current PBA. If so: keep the PBA consecutive segment counter unchanged (because a consecutive PBA segment is not broken); update the current PBA to the next PBA. If not: increase the PBA consecutive segment counter by 1 (because a consecutive PBA segment is broken); update the current PBA to the next PBA.

Step 3: Repeat Step 2 until the last LBA of the file has been checked. Determine the average consecutive physical address length of the file as the length of the file divided by the PBA consecutive segment counter.

At 608, the memory controller determines a read performance level based on the average consecutive physical address length and a read performance curve. The read performance curve may represent an estimate of random read performance of the memory device for a given chunk size. In some implementations, the read performance curve is determined by performing a random read test or experiment on the memory device. In the random read experiment, files of various chunk sizes are located at random physical addresses of the memory device, and read speeds of the files are measured. The chunk size can be a contiguous storage space each smallest unit of the files occupies.

Figure 7:
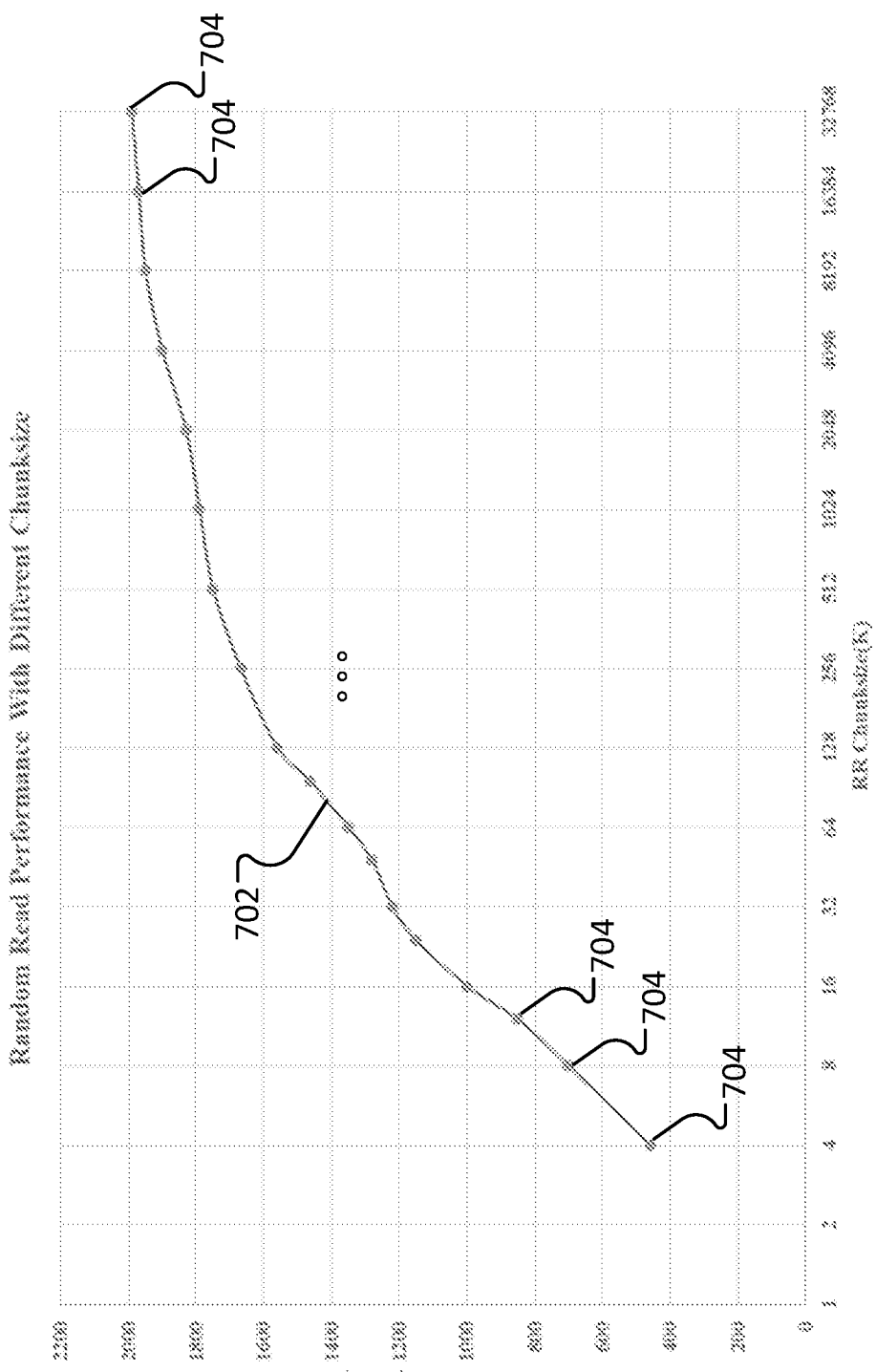
FIG. 7 illustrates a diagram showing an example read performance curve, in accordance with some aspects of the present disclosure.

FIG. 7 illustrates a diagram 700 showing an example read performance curve 702, in accordance with some aspects of the present disclosure. The horizontal axis of diagram 700 is a random read chunk size measured in the unit of KB. The vertical axis of diagram 700 is read performance measured in the unit of mega bytes per second (MB/S). The read performance curve 702 is plotted by connecting data points 704. Each data point 704 is determined by performing a reading performance test on the memory device. The reading performance test may involve reading a file of various chunk sizes and measuring the actual reading speed. In some implementations, the read performance curve 702 is predetermined. Given an average consecutive physical address length, the memory controller may determine a read performance level by finding a point on the read performance curve 702 whose random read chunk size (on the horizontal axis) equals the average consecutive physical address length and determining the read performance of the point on the vertical axis.

Referring back to method 600 of FIG. 6, at 610, the memory controller compares the average consecutive physical address length of the file to a threshold. For example, the threshold can be 16 KB. If the average consecutive physical address length is larger than the threshold, method 600 proceeds to 612, where the memory controller returns the read performance level to the host as the fragmentation level of the file. If the average consecutive physical address length is equal to or less than the threshold, method 600 proceeds to 614.

At 614, the memory controller determines a value based on a distribution of physical addresses of the file. At 616, the memory controller adjusts the read performance level based on the value. At 618, the memory controller returns the adjusted read performance level to the host as the fragmentation level of the file.

If the file is highly fragmented (i.e., the average consecutive physical address length is small), the distribution of the file among different planes of the memory device can also contribute to the fragmentation level of the file. In this situation, a file whose physical addresses are spread more evenly among all planes of the memory device can be considered as more fragmented. For example, FIG. 5C shows that file 500 (referred to as file A) is spread among 8 planes of 2 dies of the memory device. Assuming that there is another file (referred to as file B) that has an average consecutive physical address length similar to file 500 but is stored only in planes 534 and 536 of die 530, file A and file B may have similar read performance levels based on the read performance curve. But file B is more fragmented because it occupies less planes in the memory device. Therefore, when the average consecutive physical address length of the file is smaller than the threshold, the memory controller may evaluate the fragmentation level of the file more accurately by adjusting the read performance level using the value determined based on the distribution of physical addresses of the file.

In some implementations, the memory controller may adjust the read performance level using the following algorithm.

Step 1: Determine a total number of planes (e.g., N) that store a piece of data of the file. Count how many physical addresses of the file are located in each plane. $P_i$ denotes the number of physical addresses of the file located in plane i (1≤i≤N). In some implementations, the memory device includes multiple dies, and each die includes multiple planes. In this case, all planes in the memory device should be considered, even though they may belong to different dies.

Step 2: Calculate an average physical address number $$\overline{P} = \frac{1}{N}\sum_{i=1}^{N} P_i.$$

Step 3: Calculate a standard deviation of $$P_i (1 \le i \le N): S = \sqrt{\frac{1}{N}\sum_{i=1}^{N}(P_i - \overline{P})^2}.$$

Step 4: Determine the value as $$1 + \frac{S^2}{\overline{P}^2},$$

and determine the adjusted read performance level as the read performance level divided by $$1 + \frac{S^2}{\bar{P}^2}.$$

For example, FIG. 5C illustrates that file 500 has PBAs distributed among 8 planes. N=8. $P_1$=2. $P_2$=5. $P_3$=1. $P_4$=1. $P_5$=3. $P_6$=3. $P_7$=0. $P_8$=1. $\bar{P}$=2. S=1.5. The value for file 500 is 1.5625. The adjusted read performance level of file 500 can be the read performance level determined by the read performance curve (e.g., read performance curve 702) and then divided by 1.5625.

It should be appreciated that the above algorithm to adjust a read performance level of a file is merely an example for illustrative purposes. The memory controller may use any other suitable method to adjust the read performance level of the file based on a distribution of physical addresses of the file.

In some implementations, the host receives the fragmentation level from the memory controller. The host may transmit a command to the memory controller upon determining that the fragmentation level is above a fragmentation level threshold. The command instructs the memory controller to perform defragmentation. The method 600 may further include the memory controller receiving the command and performing the defragmentation based on the received command.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

According to one aspect of the present disclosure, a method for operating a memory controller is disclosed. The method includes receiving, from a host, a request for a fragmentation level of a file stored in a memory device. The method further includes determining a read performance level of the file based on a logical-to-physical (L2P) address mapping table corresponding to the file without reading the file from the memory device. The method further includes determining the fragmentation level based on the read performance level.

In some implementations, the request includes a plurality of logical addresses of the file. The determining the read performance level of the file includes reading the L2P address mapping table from the memory device, determining an average consecutive physical address length of the file based on the plurality of logical addresses of the file and the L2P address mapping table, and determining the read performance level based on at least the average consecutive physical address length and a predetermined read performance curve.

In some implementations, the determining the average consecutive physical address length of the file includes mapping the plurality of logical addresses to physical address segments according to the L2P address mapping table. Each of the physical address segments includes one or more consecutive physical addresses. The determining the average consecutive physical address length of the file further includes determining the average consecutive physical address length. The average consecutive physical address length is determined based on a sum of a quantity of the one or more consecutive physical addresses included in each of the physical address segments and a quantity of the physical address segments.

In some implementations, each logical address of the plurality of logical addresses is a logical block address (LBA), and each physical address in the physical address segments is a physical block address (PBA).

In some implementations, the predetermined read performance curve is determined by performing a random read experiment on the memory device using test data of various chunk sizes.

In some implementations, the determining the read performance level includes determining an initial read performance level corresponding to the average consecutive physical address length based on the predetermined read performance curve and determining whether the average consecutive physical address length is larger than a threshold.

In some implementations, the determining the read performance level further includes in response to determining that the average consecutive physical address length is larger than the threshold, determining the read performance level as the initial read performance level.

In some implementations, the determining the read performance level further includes in response to determining that the average consecutive physical address length is not larger than the threshold, determining the read performance level as the initial read performance level adjusted by a value. The value is determined based on a distribution of physical addresses of the file among a number of planes of the memory device.

In some implementations, the read performance level is determined based on the initial read performance level and the value. The value is determined based on how evenly the physical addresses of the file are spread among the number of planes of the memory device. The value is smaller if the physical addresses of the file are spread more evenly among the number of planes of the memory device.

In some implementations, the memory device includes a three-dimensional (3D) NAND Flash memory device.

In some implementations, the request is a File Based Optimization (FBO) request under a Universal Flash Storage (UFS) 4.0 technical standard.

In some implementations, the method further includes returning the fragmentation level to the host. The method further includes receiving a command from the host to perform defragmentation. The host transmits the command in response to determining that the fragmentation level is above a fragmentation level threshold. The method further includes performing the defragmentation based on the received command.

According to another aspect of the present disclosure, a memory system is disclosed. The memory system includes a memory device and a memory controller. The memory controller includes one or more processors and a computer storage medium. The computer storage medium is coupled to the one or more processors and stores programming instructions for execution by the one or more processors to cause the memory controller to perform operations. The operations include receiving, from a host, a request for a fragmentation level of a file stored in the memory device, determining a read performance level of the file based on a logical-to-physical (L2P) address mapping table corresponding to the file without reading the file from the memory device, and determining the fragmentation level based on the read performance level.

In some implementations, the request includes a plurality of logical addresses of the file. The determining the read performance level of the file includes reading the L2P address mapping table from the memory device, determining an average consecutive physical address length of the file based on the plurality of logical addresses of the file and the L2P address mapping table, and determining the read performance level based on at least the average consecutive physical address length and a predetermined read performance curve.

In some implementations, the determining the average consecutive physical address length of the file includes mapping the plurality of logical addresses to physical address segments according to the L2P address mapping table. Each of the physical address segments includes one or more consecutive physical addresses. The determining the average consecutive physical address length of the file further includes determining the average consecutive physical address length. The average consecutive physical address length is determined based on a sum of a quantity of the one or more consecutive physical addresses included in each of the physical address segments and a quantity of the physical address segments.

In some implementations, each logical address of the plurality of logical addresses is a logical block address (LBA), and each physical address in the physical address segments is a physical block address (PBA).

In some implementations, the predetermined read performance curve is determined by performing a random read experiment on the memory device using test data of various chunk sizes.

According to another aspect of the present disclosure, a non-transitory computer storage medium is disclosed. The non-transitory computer storage medium is coupled to one or more processors of a memory controller and stores programming instructions for execution by the one or more processors to cause the memory controller to perform operations. The operations include receiving, from a host, a request for a fragmentation level of a file stored in a memory device, determining a read performance level of the file based on a logical-to-physical (L2P) address mapping table corresponding to the file without reading the file from the memory device, and determining the fragmentation level based on the read performance level.

In some implementations, the request includes a plurality of logical addresses of the file. The determining the read performance level of the file includes reading the L2P address mapping table from the memory device, determining an average consecutive physical address length of the file based on the plurality of logical addresses of the file and the L2P address mapping table, and determining the read performance level based on at least the average consecutive physical address length and a predetermined read performance curve.

In some implementations, the determining the average consecutive physical address length of the file includes mapping the plurality of logical addresses to physical address segments according to the L2P address mapping table. Each of the physical address segments includes one or more consecutive physical addresses. The determining the average consecutive physical address length of the file further includes determining the average consecutive physical address length. The average consecutive physical address length is determined based on a sum of a quantity of the one or more consecutive physical addresses included in each of the physical address segments and a quantity of the physical address segments.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A method for operating a memory controller, comprising:
receiving, from a host, a request for a fragmentation level of a file stored in a memory device;
reading a logical-to-physical (L2P) address mapping table from the memory device, the L2P address mapping table corresponding to the file;
determining a read performance level of the file based on an average consecutive physical address length of the file and the L2P address mapping table; and
determining the fragmentation level based on the read performance level.

2. The method according to claim 1, wherein the request comprises a plurality of logical addresses of the file, and wherein determining the read performance level of the file comprises:
determining the average consecutive physical address length of the file based on the plurality of logical addresses of the file and the L2P address mapping table; and
determining the read performance level based on at least the average consecutive physical address length and a predetermined read performance curve.

3. The method according to claim 2, wherein determining the average consecutive physical address length of the file comprises:
mapping the plurality of logical addresses to physical address segments according to the L2P address mapping table, wherein each of the physical address segments comprises one or more consecutive physical addresses; and
determining the average consecutive physical address length, wherein the average consecutive physical address length is determined based on a sum of a quantity of the one or more consecutive physical addresses comprised in each of the physical address segments and a quantity of the physical address segments.

4. The method according to claim 3, wherein:
each logical address of the plurality of logical addresses is a logical block address (LBA); and
each physical address in the physical address segments is a physical block address (PBA).

5. The method according to claim 2, wherein the predetermined read performance curve is determined by performing a random read experiment on the memory device using test data of various chunk sizes.

6. The method according to claim 2, wherein determining the read performance level comprises:
determining an initial read performance level corresponding to the average consecutive physical address length based on the predetermined read performance curve; and
determining whether the average consecutive physical address length is larger than a threshold.

7. The method according to claim 6, wherein determining the read performance level further comprises:
in response to determining that the average consecutive physical address length is larger than the threshold, determining the read performance level as the initial read performance level.

8. The method according to claim 6, wherein determining the read performance level further comprises:
in response to determining that the average consecutive physical address length is not larger than the threshold, determining the read performance level as the initial read performance level adjusted by a value that is determined based on a distribution of physical addresses of the file among a number of planes of the memory device.

9. The method according to claim 8, wherein:
the read performance level is determined based on the initial read performance level and the value; and
the value is determined based on how evenly the physical addresses of the file are spread among the number of planes of the memory device.

10. The method according to claim 1, wherein the memory device comprises a three-dimensional (3D) NAND Flash memory device.

11. The method according to claim 1, wherein the request is a File Based Optimization (FBO) request under a Universal Flash Storage (UFS) 4.0 technical standard.

12. The method according to claim 1, further comprising:
returning the fragmentation level to the host;
receiving a command from the host to perform defragmentation, wherein the host transmits the command in response to determining that the fragmentation level is above a fragmentation level threshold; and
performing the defragmentation based on the received command.

13. A memory system comprising:
a memory device; and
a memory controller comprising one or more processors and a computer storage medium, wherein the computer storage medium is coupled to the one or more processors and stores programming instructions for execution by the one or more processors to cause the memory controller to perform operations comprising:
receiving, from a host, a request for a fragmentation level of a file stored in the memory device;
reading a logical-to-physical (L2P) address mapping table from the memory device, the L2P address mapping table corresponding to the file;
determining a read performance level of the file based on an average consecutive physical address length of the file and the L2P address mapping table; and
determining the fragmentation level based on the read performance level.

14. The memory system according to claim 13, wherein the request comprises a plurality of logical addresses of the file, and wherein determining the read performance level of the file comprises:
determining the average consecutive physical address length of the file based on the plurality of logical addresses of the file and the L2P address mapping table; and
determining the read performance level based on at least the average consecutive physical address length and a predetermined read performance curve.

15. The memory system according to claim 14, wherein determining the average consecutive physical address length of the file comprises:
mapping the plurality of logical addresses to physical address segments according to the L2P address mapping table, wherein each of the physical address segments comprises one or more consecutive physical addresses; and determining the average consecutive physical address length, wherein the average consecutive physical address length is determined based on a sum of a quantity of the one or more consecutive physical addresses comprised in each of the physical address segments and a quantity of the physical address segments.

16. The memory system according to claim 15, wherein:
each logical address of the plurality of logical addresses is a logical block address (LBA); and
each physical address in the physical address segments is a physical block address (PBA).

17. The memory system according to claim 14, wherein the predetermined read performance curve is determined by performing a random read experiment on the memory device using test data of various chunk sizes.

18. A non-transitory computer storage medium, wherein the non-transitory computer storage medium is coupled to one or more processors of a memory controller and stores programming instructions for execution by the one or more processors to cause the memory controller to perform operations comprising:
receiving, from a host, a request for a fragmentation level of a file stored in a memory device;
reading a logical-to-physical (L2P) address mapping table from the memory device, the L2P address mapping table corresponding to the file;
determining a read performance level of the file based on an average consecutive physical address length of the file and the L2P address mapping table; and
determining the fragmentation level based on the read performance level.

19. The non-transitory computer storage medium according to claim 18, wherein the request comprises a plurality of logical addresses of the file, and wherein determining the read performance level of the file comprises:
determining the average consecutive physical address length of the file based on the plurality of logical addresses of the file and the L2P address mapping table; and
determining the read performance level based on at least the average consecutive physical address length and a predetermined read performance curve.

20. The non-transitory computer storage medium according to claim 19, wherein determining the average consecutive physical address length of the file comprises:
mapping the plurality of logical addresses to physical address segments according to the L2P address mapping table, wherein each of the physical address segments comprises one or more consecutive physical addresses; and
determining the average consecutive physical address length, wherein the average consecutive physical address length is determined based on a sum of a quantity of the one or more consecutive physical addresses comprised in each of the physical address segments and a quantity of the physical address segments.

* * * * *